United States Patent [19]
Thomas

[11] Patent Number: 5,997,059
[45] Date of Patent: Dec. 7, 1999

[54] SAFETY BUMPER

[76] Inventor: David A. Thomas, 1708 E. McMillan, Marshfield, Wis. 54449

[21] Appl. No.: 09/087,963

[22] Filed: Jun. 1, 1998

Related U.S. Application Data

[60] Provisional application No. 60/062,080, Oct. 15, 1997.

[51] Int. Cl.$^6$ ................................................. B60R 19/54
[52] U.S. Cl. ............................................ 293/125; 293/17
[58] Field of Search .............................. 293/17, 125, 49

[56] References Cited

U.S. PATENT DOCUMENTS

| | | | |
|---|---|---|---|
| 2,069,282 | 2/1937 | Silverman | 293/125 |
| 2,245,746 | 6/1941 | Bang . | |
| 2,508,836 | 5/1950 | Morris . | |
| 2,541,364 | 2/1951 | Jurasevich | 293/125 |
| 2,840,411 | 6/1958 | Mason . | |
| 3,708,195 | 1/1973 | Kottsieper . | |
| 3,997,209 | 12/1976 | Chika . | |
| 4,068,877 | 1/1978 | Burleson . | |
| 5,478,124 | 12/1995 | Warrington et al. . | |

FOREIGN PATENT DOCUMENTS

| | | |
|---|---|---|
| 2321439 | 12/1973 | Germany . |
| 451392 | 8/1936 | United Kingdom . |

*Primary Examiner*—Joseph D. Pape
*Attorney, Agent, or Firm*—Richard C. Litman

[57] ABSTRACT

A safety bumper device incorporating a plurality of rotative bearing members that rotate to deflect the oblique forces of impact and absorb some of the head-on forces of impact. Two different rotative bearing members are shown. The bearing members are covered by a breakaway shield that helps to reduce aerodynamic drag. Upon impact, the breakaway shield gives way, exposing the faces of the bearing members so that the rotation of the bearings can deflect the oblique forces of impact.

8 Claims, 3 Drawing Sheets

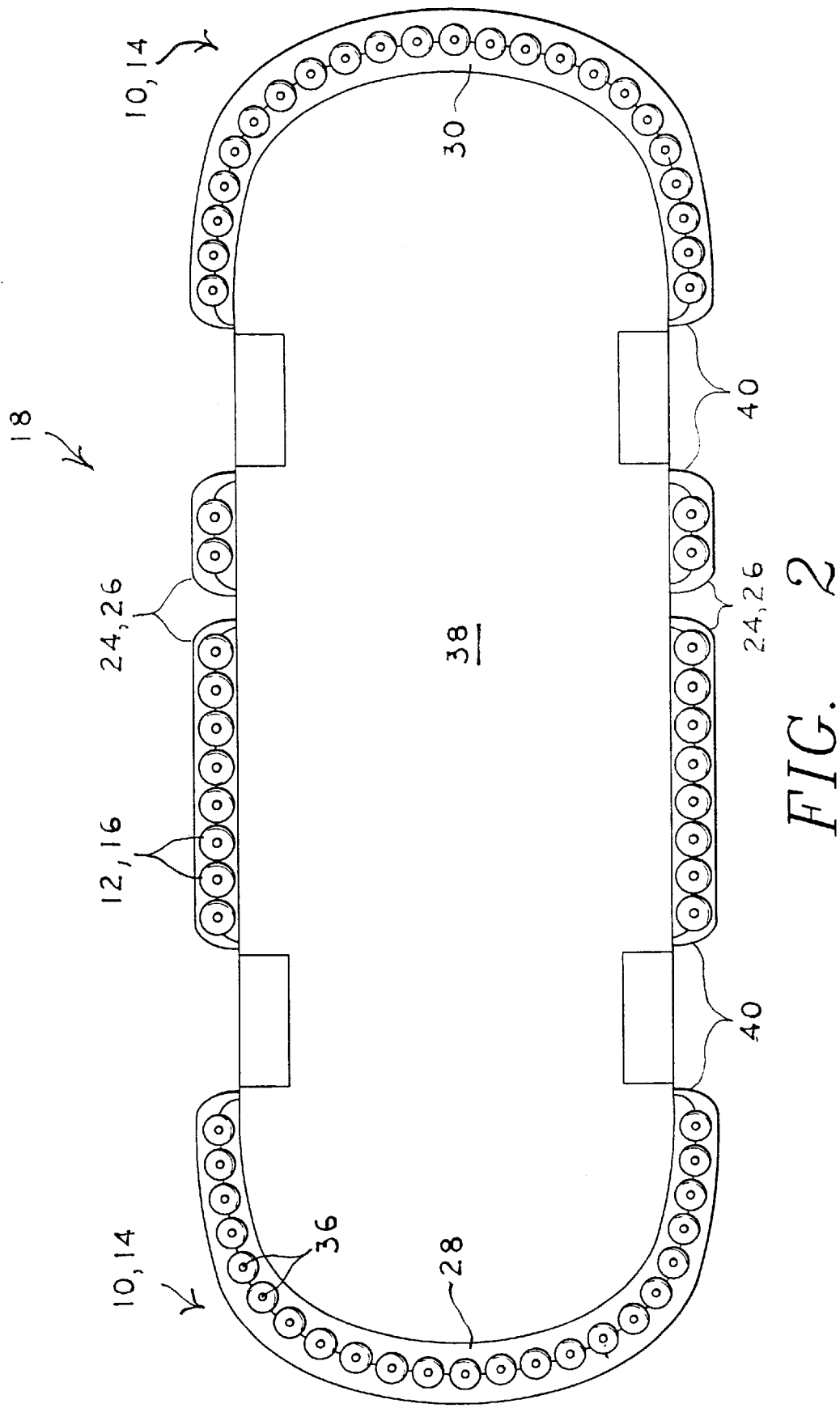

SAFETY BUMPER

CROSS-REFERENCE TO RELATED APPLICATION

This application claims the benefit of U.S. Provisional Patent Application Ser. No. 60/062,080, filed Oct. 15, 1997.

BACKGROUND OF THE INVENTION

1. Field of the Invention

The present invention relates to vehicle bumpers, and more particularly, to a safety bumper for automobiles that deflects oblique forces of impact and absorbs the head-on forces of impact.

2. Description of Related Art

The related art of interest describe various bumpers useful for protection of a vehicle or for pushing another vehicle. In general, these devices are bulky, heavy and they substantially increase the aerodynamic drag of the vehicle. Such devices substantially deviate from the standard shapes of a modern bumper and hence, they may not be aesthetically pleasing. The weight and increased drag caused by such devices will reduce vehicle performance and fuel economy.

Accordingly, there is a need for a safety bumper device that is incorporated into the basic contours of a modern automobile bumper so that the overall aesthetics of the vehicle are not adversely affected. Another need will be seen for a safety bumper device that will not increase the aerodynamic drag of the vehicle. Yet another need will be seen for a safety bumper device that is lightweight. Overall, such a device should not substantially reduce vehicle performance or fuel economy. In addition, there is a need for a device as described above that is easily and economically produced.

Related bumper devices with claimed safety features are discussed below in the order of perceived relevance to the present invention.

German Patent Application Number 2,321,439 published on Nov. 15, 1973, for Sanchez Calzada et al. describes a roller system that envelopes the entire periphery of a vehicle and extends significantly in front and in the rear. There is no indication of jointed regions to permit entry into the vehicle. Other adaptations are for protecting a corner of a house, a lantern, and a bow of a boat to deflect oblique forces of impact. The uncovered device for a vehicle is bulky, heavy and used only to protect: a parked vehicle. Even if utilized as a permanent installation, the exposed roller assembly is not aesthetically pleasing. The weight and increased drag caused by the device if used during driving, will reduce vehicle performance and fuel economy.

U.S. Pat. No. 3,997,209 issued on Dec. 14, 1976, to John J. Chika describes a collision deflecting front and rear bumper system including side plates and side rollers for fast moving vehicles. The bumper includes an elaborate, extendible and retractable bumper assembly by hydraulic cylinders and operable by either manual or automatic controls with sensors. This device is excessively complex, bulky, heavy, and substantially increases the aerodynamic drag of the vehicle. The weight and increased drag caused by the device for front and rear installation reduces vehicle performance and fuel economy. The collision deflecting system is distinguishable for its different protection systems for the different regions of the vehicle.

U.S. Pat. No. 2,245,746 issued on Jun. 17, 1941, to Soren H. Bang describes a cowcatcher for automobiles. The device includes rotary rollers arranged vertically to cover only the front grille of the automobile. The rollers consist of a solid steel tube covered with rubber or upholstery. A screen is necessary to direct incoming air up toward the radiator. The apparatus is distinguishable for its limitation to the grille.

U.S. Pat. No. 2,508,836 issued on May 23, 1950, to Elmer L. Morris describes a bumper for automobiles. The V-shaped bumper includes steel ball impact receiving elements. The apex of the bumper includes steel leaf springs. The bumper is mounted on a compensating crossbar with two hydraulic shock absorbers. The bumper is distinguishable for its reliance on leaf springs and hydraulic shock absorbers in addition to the steel balls.

U.S. Pat. No. 2,840,411 issued on Jun. 24, 1958, to Philip E. Mason describes a rollaway bumper for installation on both ends of the vehicle. A V-shaped bumper has a large roller at the apex and smaller rollers at its ends. A channel shaped body portion also supports an exposed endless chain. The bumper is distinguishable for its exposed endless chain which is unattractive and must be exposed to functionally support the bumper action.

U.S. Pat. No. 3,708,195 issued on Jan. 2, 1973, to Edward Kottsieper describes an impact softening device for the front and rear of automobiles. The device includes resilient wheels rotatably mounted in horizontal positions on vertical axles at the ends of each bumper. This device is distinguishable for being bulky, heavy and limited to the ends of the vehicle bumpers.

U.S. Pat. No. 4,068,877 issued on Jan. 17, 1973, to Finn Burleson describes a roller vehicle pushing bumper having a pair of resilient rollers rotatably mounted vertically on a bracket secured to a front bumper of a motor vehicle. The device is distinguishable for its limitation to a pushing bumper.

U.K. Patent Application No. 451,392 published on Sep. 3, 1936, for Harry Panzetta describes a bumper device with paired buffers made of india rubber rotatably fitted at the ends of the bumper in a horizontal position above and below the bumper. The device is distinguishable for being limited to the ends of a bumper.

U.S. Pat. No. 5,478,124 issued on Dec. 26, 1995, to Bruce Warrington et al. describes a portable rolling bumper for pushing another vehicle. The bumper has a straight leg adapter portion for engaging with the mount receiver, caross-bar portion secured at a right angle to the receiver, and an elongate cylindrical roller held with the cross-bar portion between two laterally extended end arms. The adapter portion includes positioning apertures that all the distance between the roller and the vehicle to be adjusted. The cross-bar portion has similar positioning apertures that allow the height of the roller to be adjusted. The bumper is distinguishable for its single bumper roller and use for pushing another vehicle.

None of the above noted inventions and patents, taken either singly or in combination, is seen to describe the instant invention as claimed.

SUMMARY OF THE INVENTION

By the present invention, a safety bumper device incorporating a plurality of rotative bearing members that rotate to deflect oblique forces of impact and absorb some of the head-on forces of impact is disclosed. The bearing members are covered by a breakaway shield that reduces aerodynamic drag. Upon impact with another object, the breakaway shield gives way, exposing the faces of the bearing members so that the rotation of the bearings can deflect the oblique forces of impact.

Accordingly, it is a principal object of the present invention to provide a safety bumper device which deflects most of the oblique forces of impact and absorb some of the head-on forces of impact.

Another of object of the present invention is to provide a safety bumper device with bearing elements that are incorporated inside the basic contours of the bumpers of a modern automobile to retain the aesthetics of the vehicle and not compromise the aerodynamic drag of the vehicle.

Yet another object of the present invention is to provide a safety bumper device that is lightweight.

Still another object of the present invention is to provide a safety bumper device that does not significantly reduce the performance or fuel economy of the vehicle.

A final object of the present invention is to provide a safety bumper device that is economical to produce.

These and other objects of the present invention will be more readily apparent as the nature of the invention is hereinafter more fully described, illustrated and claimed with reference being made to the attached drawings.

BRIEF DESCRIPTION OF THE DRAWINGS

FIG. 2 is a sectional view along lines 2—2 of the vehicle in FIG. 1A.

Similar reference characters denote corresponding features consistently throughout the attached drawings.

DETAILED DESCRIPTION OF THE PREFERRED EMBODIMENTS

The present invention is a safety bumper device that incorporates a plurality of rotative bearing members that rotate to deflect oblique forces of impact and absorb some of the head-on forces of impact. The bearing members are covered by a breakaway shield that helps to reduce aerodynamic drag. Upon impact, the breakaway shield gives way, exposing the faces of the bearing members so that the rotation of the bearings can deflect the forces of impact.

Embodiments of the various aspects of the present invention will now be explained with reference to the accompanying drawings.

Figure 1A:
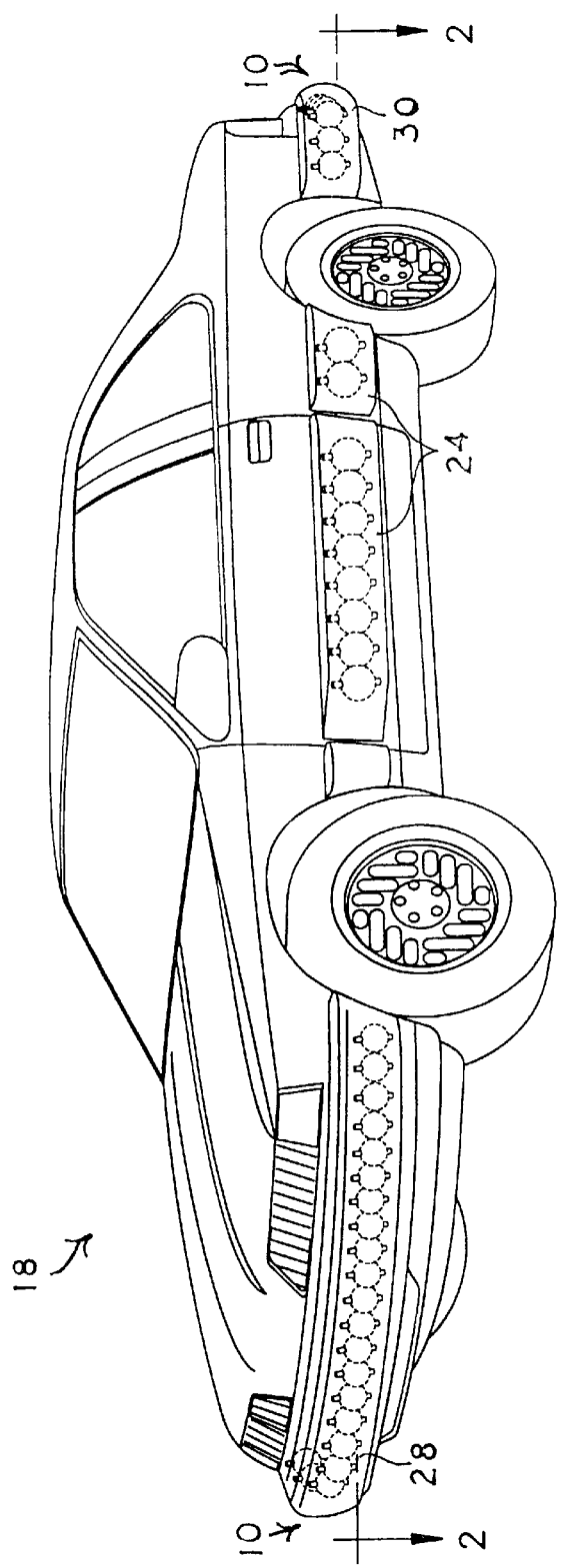
FIG. 1A is a perspective view of a vehicle with the first embodiment of journaled spherical roller-type bearing members surrounding the periphery of the vehicle with the spherical bearing members shown in phantom lines inside the bumpers.
Figure 1B:
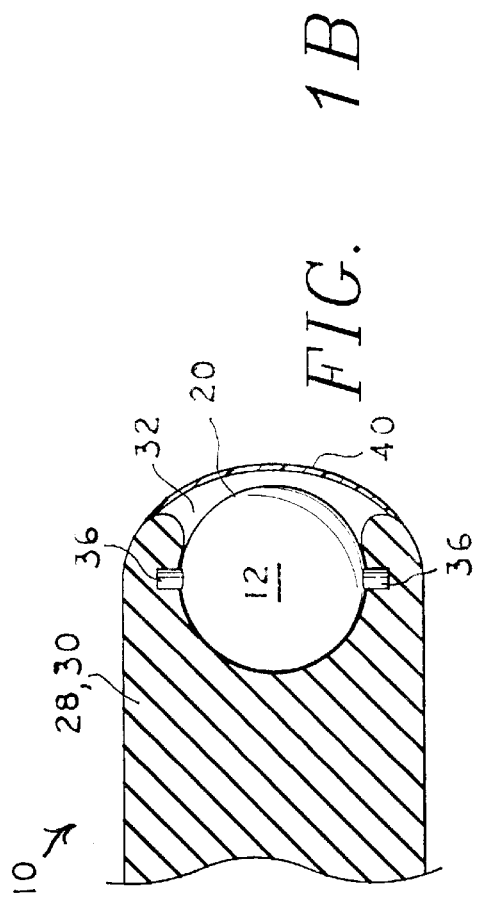
FIG. 1B is an enlarged scale, detail view of a sectional view of the bumper in FIG. 1A.
Figure 3A:
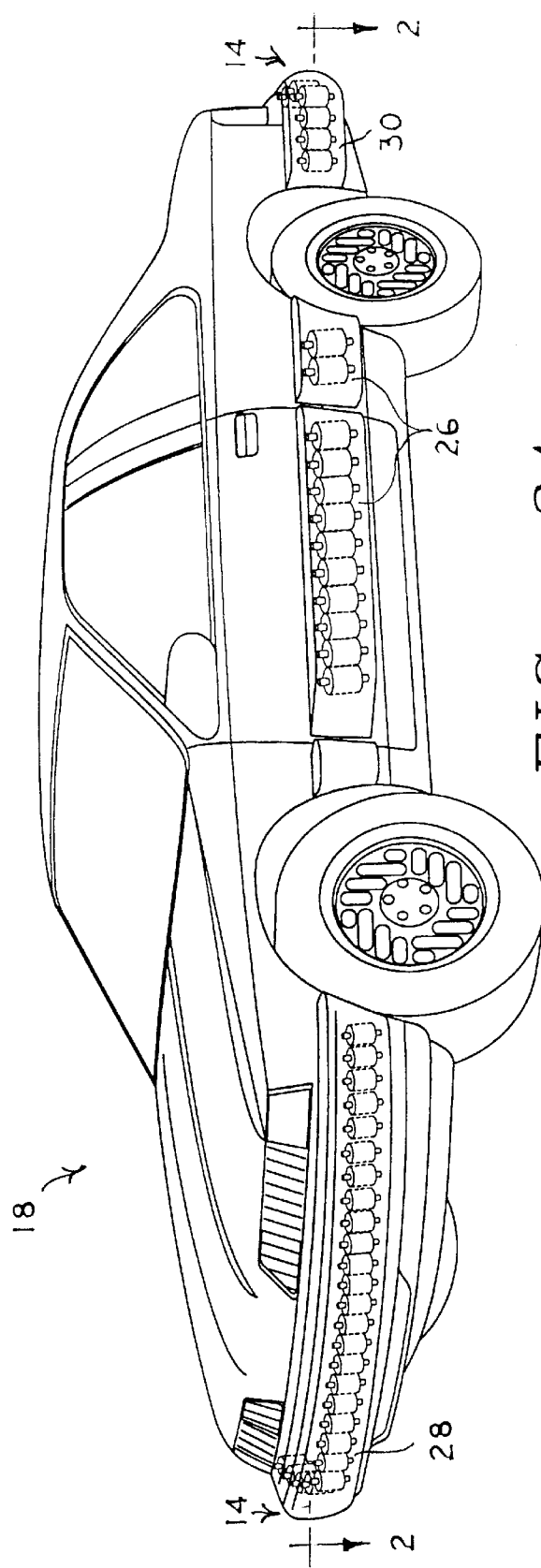
FIG. 3A is a perspective view of a vehicle with a second embodiment of journaled roller bearing members surrounding the periphery of the vehicle with the bearing members shown in hidden lines inside the bumpers.
Figure 3B:
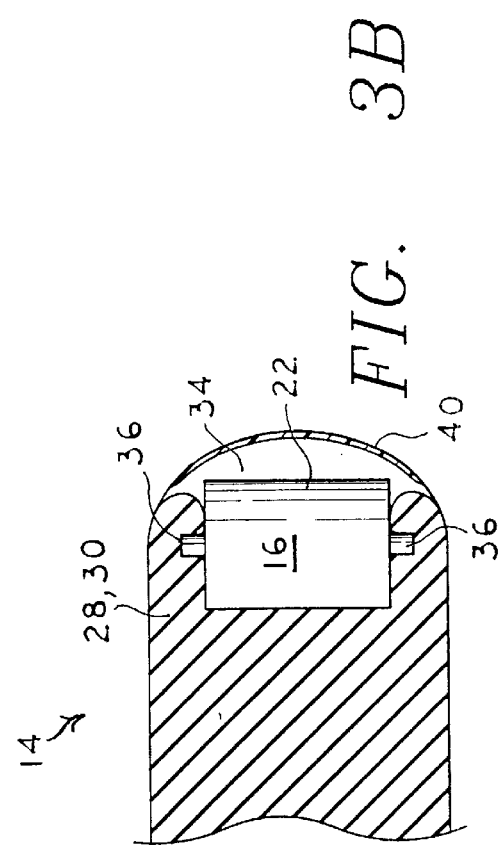
FIG. 3B is an enlarged scale, detail view of a sectional view of the bumper in FIG. 3A.

In FIGS. 1A, 1B and 2, a preferred embodiment of the present safety bumper device 10 incorporates spherical roller bearing members 12. In FIGS. 3A and 3B as a second embodiment of a safety bumper device 14 journaled cylindrical roller bearing members 16 are shown incorporated. The safety bumper device 14 for a vehicle 18 is adapted to deflect oblique forces of impact. The plurality of symmetrical and rotative bearing members 12, 16 have respective impact faces 20, 22 that are strategically placed to cover the periphery of the safety bumper devices 10, 14 and the safety side guard bumper devices 24. The side guard bumper devices 24 (FIG. 1A), 26 (FIG. 3A) are identical to the safety bumper devices 10, 14 in structure and function.

Detailed views of the safety bumper devices 10, 14 are shown in FIGS. 1B, 3B, respectively. The safety bumper devices 10, 14 show a front bumper frame 28 and a rear bumper frame 30 with customized cavitations 32, 34, respectively, for housing the bearing members 10. In both embodiments, the attaching devices for securing the bearing members 12, 16 in the customized cavitations 32, 34 of the bumper frames 28, 30, respectively, include journaled polar extenders 36 that rotatably attach to the bumper frames 28, 30, such that the impact faces 20, 22 of the bearing members 12, 16 extend slightly outward away from bumper frames 28, 30 opposite the main body 38 (FIG. 2) of the vehicle 18 to expose the faces 20, 22 of the bearing members 12, 16. However, as a critical part of the present invention, the exposed faces 20, 22 of the bearing members 12, 16 are enclosed by a breakaway or breakable shield 40.

The breakaway shield 40 gives way to substantial forces of impact so that the exposed impact faces 20, 22 of the bearing members 12, 16 can rotate to deflect the oblique forces of impact. The breakaway shield 40 is flush with the rest of the bumper to aid in reducing aerodynamic drag. It is preferred that the breakaway shield 40 is made of relatively thin, molded plastic or fiberglass.

The bearing members 12, 16 are preferably made of lightweight composite material such as thin frangible plastic to reduce weight and help improve the performance and fuel economy of the vehicle. When the safety bumpers bumper devices 10, 14, 24, and 26 are impacted, the bearing members 12, 16 can absorb some of the forces of impact by deflection and deformation.

It is preferred that the safety bumper devices 10, 14 and the side bumpers 24, 26 substantially surround the periphery of the vehicle 18 to provide the vehicle 18 protection from oblique forces of impact as well as a direct force of impact.

Thus, a protective shield for a vehicle which is lightweight, economical and effective in absorbing and minimizing the impact of a head-on or side collision has been shown.

It is to be understood that the present invention is not limited to the embodiments described above, but encompasses any and all embodiments within the scope of the following claims.

I claim:

1. A safety bumper for vehicles adapted for deflecting the oblique forces of impact comprising:

a plurality of symmetrical and rotative bearing members, each having an impact face, said bearing members covering the periphery of the bumper;

a bumper frame having customized cavitations for housing said bearing members;

attaching means for rotatably securing said bearing members in the cavitations for housing said rotative members, and arranged such that the impact faces of said bearing members extend slightly outward away from the bumper frame opposite the main body of the vehicle to expose the faces of said bearing members;

a breakaway shield to cover the faces of said bearing members, said breakaway shield giving way to the forces of impact, said breakaway shield flush with the rest of the bumper to aid in reducing aerodynamic drag; and rotatable mounting means for the bearing members, so that the bearing members are rotatable to deflect the forces of impact.

2. The safety bumper according to claim 1, wherein said bearing members are made of lightweight composite material that can partially absorb some of the forces of impact by deforming.

3. The safety bumper according to claim 1, wherein said bearing members are spherical in shape.

4. The safety bumper according to claim 1, wherein said bearing members are cylindrical in shape.

5. The safety bumper according to claim 1, wherein said attaching means include polar extenders that rotatably attach to said bumper frame.

6. The safety bumper according to claim 1, wherein said breakaway shield is made of molded plastic.

7. The safety bumper according to claim 1, wherein said breakaway shield is made of fiberglass.

8. The safety bumper according to claim 1, wherein the safety bumper substantially surrounds the whole vehicle.

\* \* \* \* \*